T. BROWN.
MANURE SPREADER.
APPLICATION FILED AUG. 25, 1911. RENEWED OCT. 14, 1914.
1,139,481.  Patented May 18, 1915.
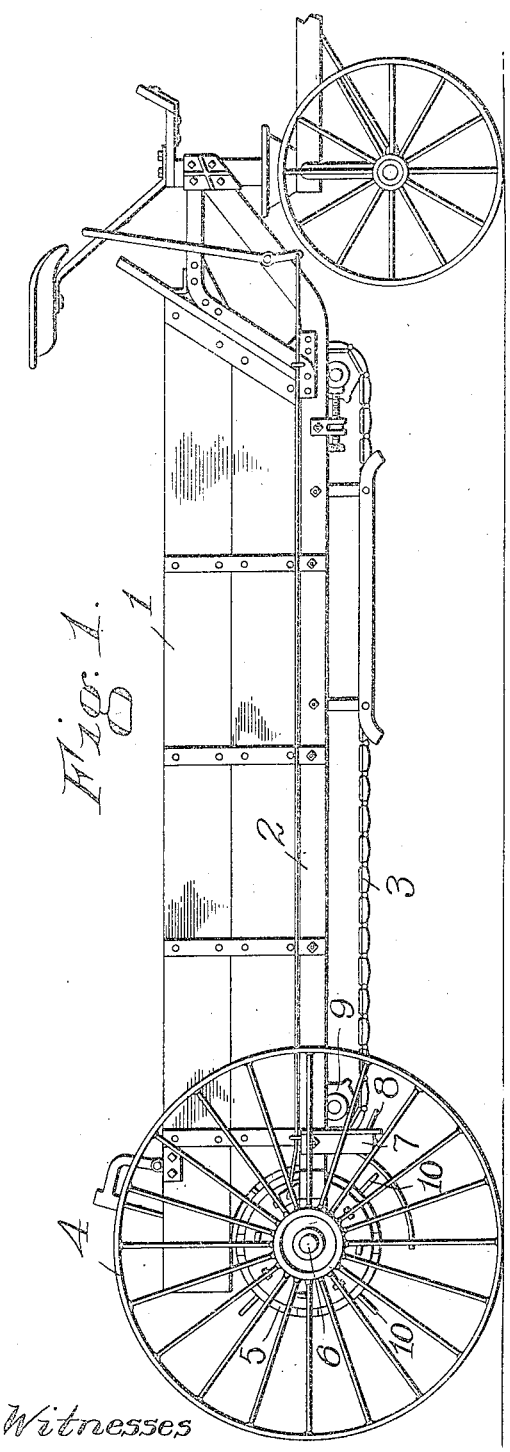
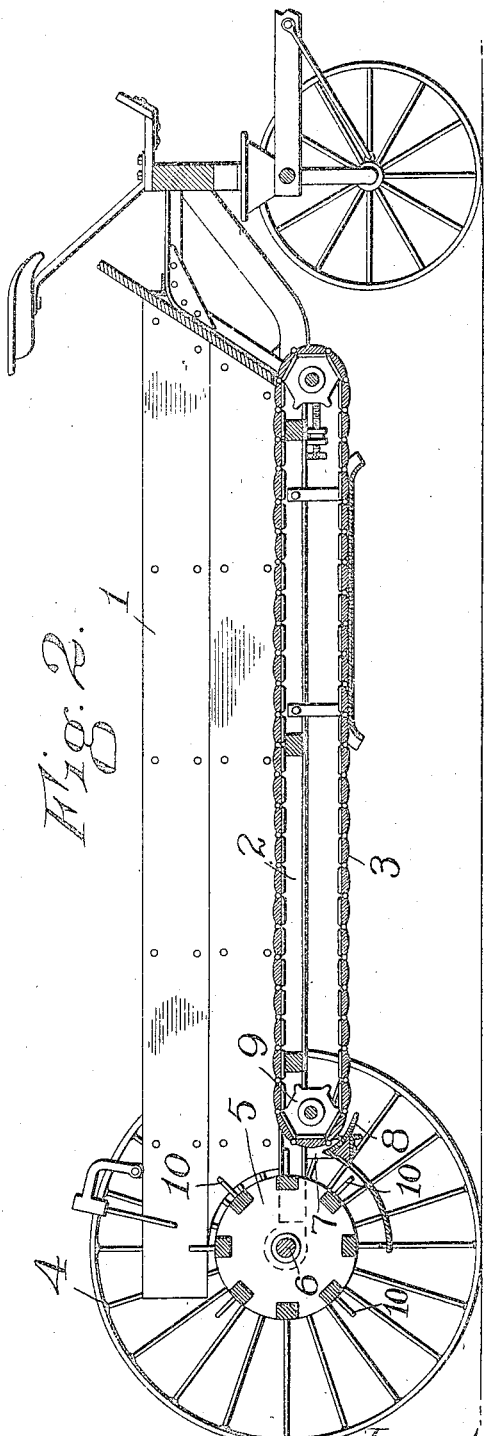
Witnesses
Roy D. Tolman.
Penelope Coulterbach.
Inventor
Theophilus Brown
By Rufus B. Fowler
Attorney

UNITED STATES PATENT OFFICE.

THEOPHILUS BROWN, OF WORCESTER, MASSACHUSETTS, ASSIGNOR, BY MESNE ASSIGNMENTS, TO MARSEILLES COMPANY, OF EAST MOLINE, ILLINOIS, A CORPORATION OF ILLINOIS.

MANURE-SPREADER.

1,139,481.      Specification of Letters Patent.      Patented May 18, 1915.

Application filed August 25, 1911, Serial No. 646,053. Renewed October 14, 1914. Serial No. 866,733.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification, accompanied by drawings forming a part of the same.

My invention relates to manure spreaders of the class provided with a movable bottom and a rotatable beater. It comprises an arrangement of the beater with its axis below the plane of the supporting surface of the movable bottom and a fixed apron below the beater and at the rear end of the movable bottom. It has for its objects to provide a beater having its axis lowered with respect to the body, in order that the teeth of the beater in their upward movement may be brought against the under side of the mass or manure as it is presented to the beater by the movable bottom; further to support the beater directly by the sills of the body and to provide means below the beater for supporting fine particles of manure which may fall through the space between the beater and the rear end of the movable bottom. In the preferable embodiment of my invention I journal the beater concentrically with the axis of the rear supporting wheels.

Referring to the drawings, Figure 1 is a side view of a spreader embodying my invention. Fig. 2 is a side elevation in longitudinal sectional view.

Similar reference characters refer to similar parts in the different figures.

In the drawings 1 is the body of the spreader mounted preferably on sills 2, 3 the movable bottom, 4 the rear supporting wheels, and 5 the rotating, toothed beater having, in the present instance, its axis coincident with the axes of the rear wheels 4 and operated from the rear wheels by a suitable connecting mechanism such, for example, as the planet and pawl and ratchet mechanism described in Letters Patent No. 947,588, issued to me January 25, 1910. The beater is placed in a position rearward of the bottom 3 and with its axis 6 below the plane of the supporting surface of the bottom 3.

Attached by brackets 7 to the sills 2 is a downwardly curved apron 8 in two parts, the forward part of which fits in close proximity to the movable bottom as it passes over the rear supporting sprocket 9, and the rearward part is extended beneath the beater 5 and in close proximity to the tips of the revolving teeth 10 of the beater. The curved apron 8 prevents the manure from falling from the apron to the ground and supports it in the path of the beater teeth.

As the teeth of the beater do not act upon the mass of manure until it passes beyond the supporting movable bottom, the disintegration of the manure is more complete and the strain imposed upon the beater teeth is materially reduced. The axes of the beater and the supporting wheels are brought coincident and in line with the extension of the sills upon which the body 1 is mounted, thereby strengthening the construction of the spreader by bringing the resistance to the action of the beater directly upon the sills and in the line of the axes of the supporting wheels.

I claim,

1. In a manure spreader, the combination of a load carrying body, a rotatable beater, a movable apron for advancing the load to the beater and terminating at points adjacent the periphery of the beater, and a guard located beneath the transverse lines at which the periphery of the beater contacts with the load, said guard being provided with two surfaces, one curved forward beneath the apron and the other curved rearward beneath the beater.

2. In a manure spreader, the combination of a load carrying body, a pair of rear ground wheels, a beater journaled on the axis of the ground wheels, a movable apron for advancing the load to the beater, and a guard positioned beneath the lines at which the upward moving parts of the beater contact with the load, said guard extending forward beneath the apron and rearward beneath the beater.

3. In a manure spreader, the combination of a load carrying body, a pair of rear ground wheels, a beater journaled on the axis of the ground wheels, a movable apron the upper surface of which is positioned in a horizontal plane above the axis of the beater, and a guard extending transverse the body at points beneath the lines at which the upward moving portion of the beater contacts with the load, a portion of the guard extending forward beneath the return stretch of the apron, and a second portion of the guard extending rearward beneath and in close proximity to the beater.

Dated this 23rd day of August, 1911,

THEOPHILUS BROWN.

Witnesses:
PENELOPE COMBERBACH,
NELLIE WHALEN.